United States Patent [19]
Shin

[11] Patent Number: 5,567,030
[45] Date of Patent: Oct. 22, 1996

[54] METHOD FOR CONTROLLING PICTURE SIZE IN AN LCD PROJECTOR

[75] Inventor: Jong-Keun Shin, Kyungsangbook-Do, Rep. of Korea

[73] Assignee: Goldstar Co., Ltd., Seoul, Rep. of Korea

[21] Appl. No.: 219,265

[22] Filed: Mar. 29, 1994

[30] Foreign Application Priority Data

Mar. 30, 1993 [KR] Rep. of Korea .................... 5103/1993

[51] Int. Cl.$^6$ .................................................. G03B 21/14
[52] U.S. Cl. .............................................. 353/85; 353/122
[58] Field of Search ............................... 353/122, 97, 85; 359/738, 739, 48

[56] References Cited

U.S. PATENT DOCUMENTS

| | | | |
|---|---|---|---|
| 4,961,087 | 10/1990 | Gaudiniet et al. ................. | 359/739 |
| 4,964,719 | 10/1990 | Tachikawa et al. ................ | 353/85 |
| 5,136,397 | 8/1992 | Miyashita ........................... | 353/85 |
| 5,379,083 | 1/1995 | Tomita ............................... | 353/97 |

FOREIGN PATENT DOCUMENTS 0105126 5/1987 Japan ..................................... 353/69

Primary Examiner—William Dowling

[57] ABSTRACT

A start-up device for automatically controlling picture size in an LCD projector during a warm-up period of a lighting source of the projector, the device including: a power detector for detecting whether power to the projector has been turned on or off; a size initializing device for initializing the picture size output by the projector to a minimum value when power is turned on; a growing device, responsive to the initializing means, for gradually increasing the picture size from the minimum size to a predetermined size, during a warm-up period. The start-up device also includes: a brightness initializing device for initially setting one or both of a picture brightness and a picture contrast to a maximum level when power is turned on; and a dimming device, responsive to the growing device, for changing the brightness and/or the contrast from the maximum level to a predetermined level, the change being completed so as to be commensurate in time with the picture size being increased to the predetermined size. The start-up device further includes: a shrinking device for gradually decreasing the picture size from the predetermined size to the minimum size when power is turned off; and a termination device, responsive to the shrinking means, for terminating projection of the picture when the minimum picture size has been attained.

21 Claims, 3 Drawing Sheets

METHOD FOR CONTROLLING PICTURE SIZE IN AN LCD PROJECTOR

BACKGROUND OF THE INVENTION

1. Field of the Invention

The present invention relates to a method for controlling picture size in an LCD (Liquid Crystal Display) projector during a warm-up period. In particular, it is directed to a method for increasing a picture size from a minimum size to a predetermined size until the lamp of lightning source produces a normal output intensity as well as decreasing the picture size to a predetermined picture size when the electric power is turned off, so that the user may watch a picture on the screen as early as possible despite the insufficient lightning intensity from the lamp during a warm-up period.

2. Description of the Prior Art

Referring to FIG. 1, a conventional LCD projector includes: a keyboard 11; a microcomputer 12 for outputting PWM (Pulse Width Modulated) signals to an integrator 13 responsive to output signals of the keyboard 11, and at the same time controlling each part of the LCD projector according to the output signals of the keyboard 11, 11; an integrator 13 for integrating and converting the PWM signals transmitted from the microcomputer 12 into a direct current; a motor driving section 14 for supplying the current to the motor 15 responsive to the current value transmitted from the integrator 13; a gear 16 rotating in a normal or reverse direction responsive to the driving direction of the motor 15; a gear 17, meshed with the gear 16, for moving the projection lens 18 forwardly or backwardly in response to the rotation of the gear 16; a relay 20 for cutting off the electric power which is supplied to a lamp 22 of the LCD projector upon the control of the microcomputer 12; a relay 21 for cutting off the electric power supplied to a fan 23 upon the control of the microcomputer 12; and a display circuit section 24 for adjusting the brightness and contrast being outputted with respect to a control of the microcomputer 12.

Referring to FIG. 2, a conventional microcomputer 12 includes: a control logic section 121; a storing section 122 for storing a value corresponding to picture sizes and values of predetermined brightness and contrast of the picture by the user; a register 123 for temporarily storing increased or decreased value of the PWM signals in on- or off-state; and a generator 124 for outputting the PWM signals according to the value stored at the register 123. Outside the microcomputer 12 are provided a display circuit section 24 for adjusting a brightness and contrast of the picture according to control signals from the control logic section 121; and a keyboard 11 for inputting signals corresponding to the user's desired function, to the microcomputer 12.

For a derailed description of the conventional method for adjusting the zoom of the LCD projector, when a user sets the power key in a state of power-on via the keyboard 11, the microcomputer 12 enables the lamp 22 and the fan 23 to be in the on-state by mining on the relays 20 and 21, and outputs the PWM signals to the integrator 13 for increasing the picture size on the screen 19. The integrator 13 integrates the PWM signals supplied from the microcomputer 12, converts the integrated PWM signals to the direct currents values, and outputs the direct current values to the motor driving section 14. The motor driving section 14 provides the current equivalent to a current value inputted from the integrator 13. In addition, the gears 16 and 17 are rotated by the motor 15 thereby moving the projection lens 18 forward or backward according to the rotation direction of the motor 15. As a result, the picture size on the screen 19 increases or decreases. Thus, according to an input of the keyboard 11 for a rotation direction or an opposite rotation direction of the motor 15, the projection lens is moved forward or backward, so that the picture size on the screen 19 increases or decreases.

But, in the conventional LCD projector, in case of using a high brightness metal halide lamp, it can not have enough brightness for displaying the picture on the screen within 40 to 60 seconds from the time of the power-on. When a user wants a picture size to be 100 sq. inch, after turning on the electric power, he must wait for, e.g., for the lamp to heat up. Thus, the user can not use the screen display for approximately a minute because of the above described problems.

SUMMARY OF THE INVENTION

Accordingly, it is an object of the present invention to provide a method for controlling picture sizes in an LCD projector which does not involve the problems encountered is the conventional art.

The objects of the present invention are fulfilled by providing an apparatus, the method embodied therein, and a memory medium article of manufacture for causing a computer to implement the method, wherein the method (for automatically controlling picture size in an LCD projector during a warm-up period of a lighting source of the projector) includes the steps of: a) detecting whether power key is on-state or off-state; b) initially projecting a minimum picture size, when the power being turned on is detected; and c) gradually increasing, during a warm-up period, the picture size.

BRIEF DESCRIPTION OF THE DRAWINGS

It will be more apparent and understood with accompanying description of the drawings.

DESCRIPTION OF THE PREFERRED EMBODIMENTS

Figure 1:
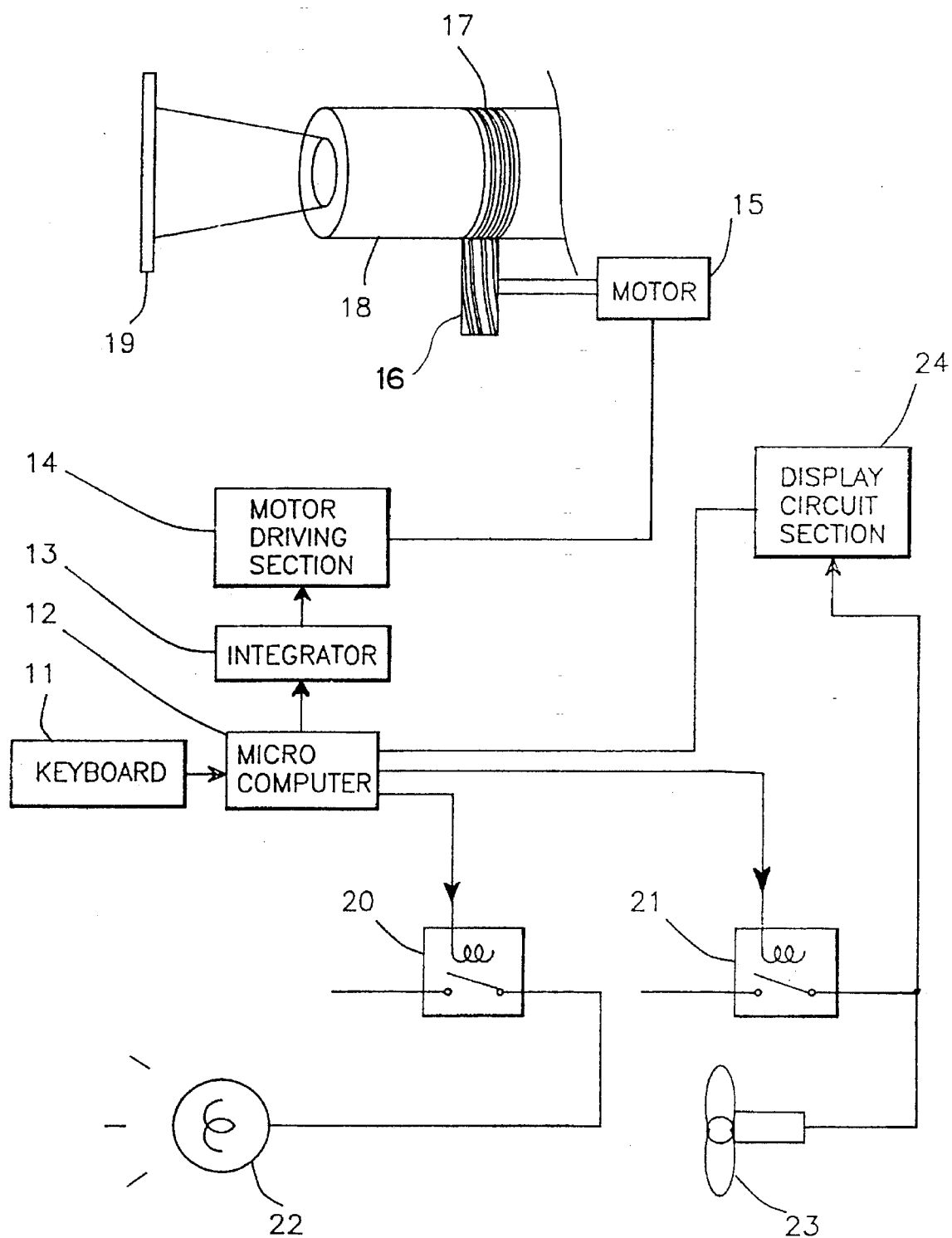
FIG. 1 is a block diagram illustrating a conventional LCD projector for a schematic description.
Figure 2:
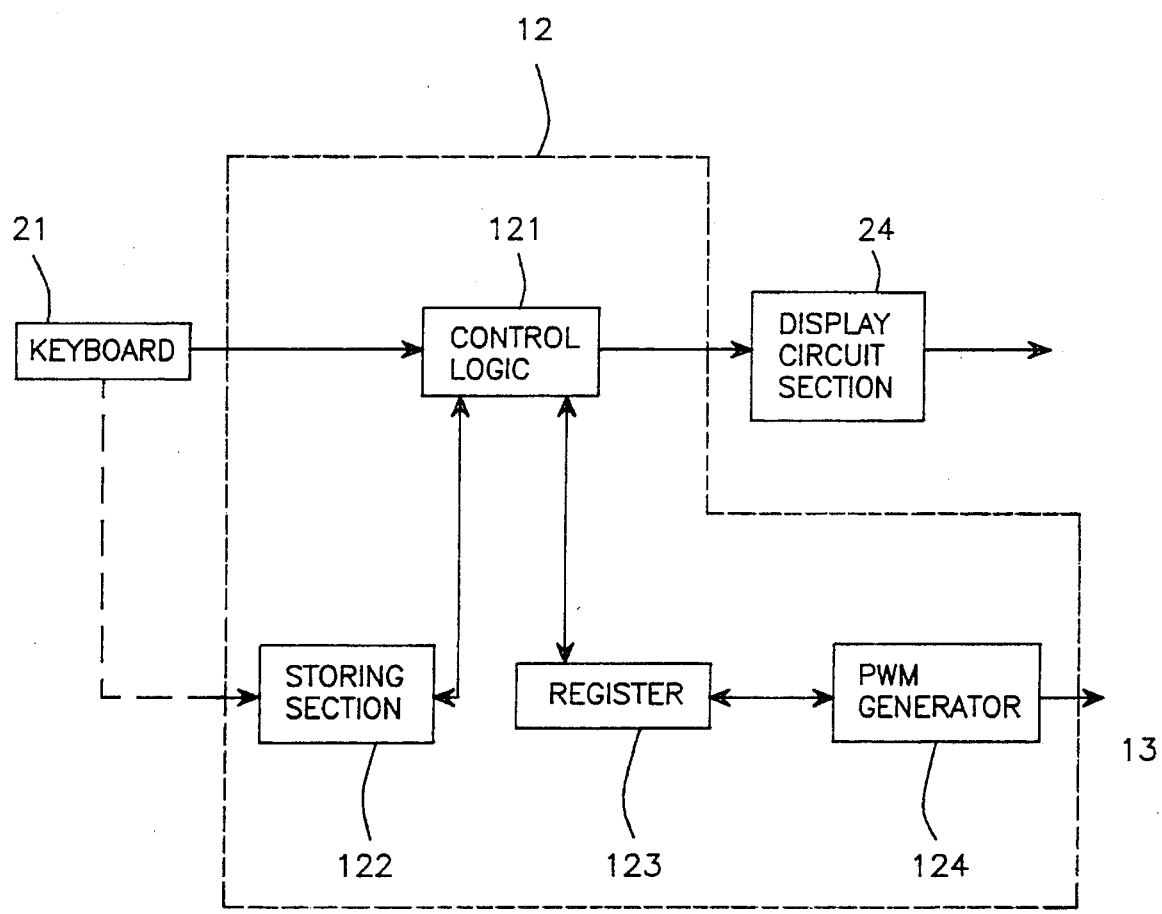
FIG. 2 is a block diagram illustrating a conventional microcomputer contained in the conventional LCD projector shown FIG. 1.
Figure 3:
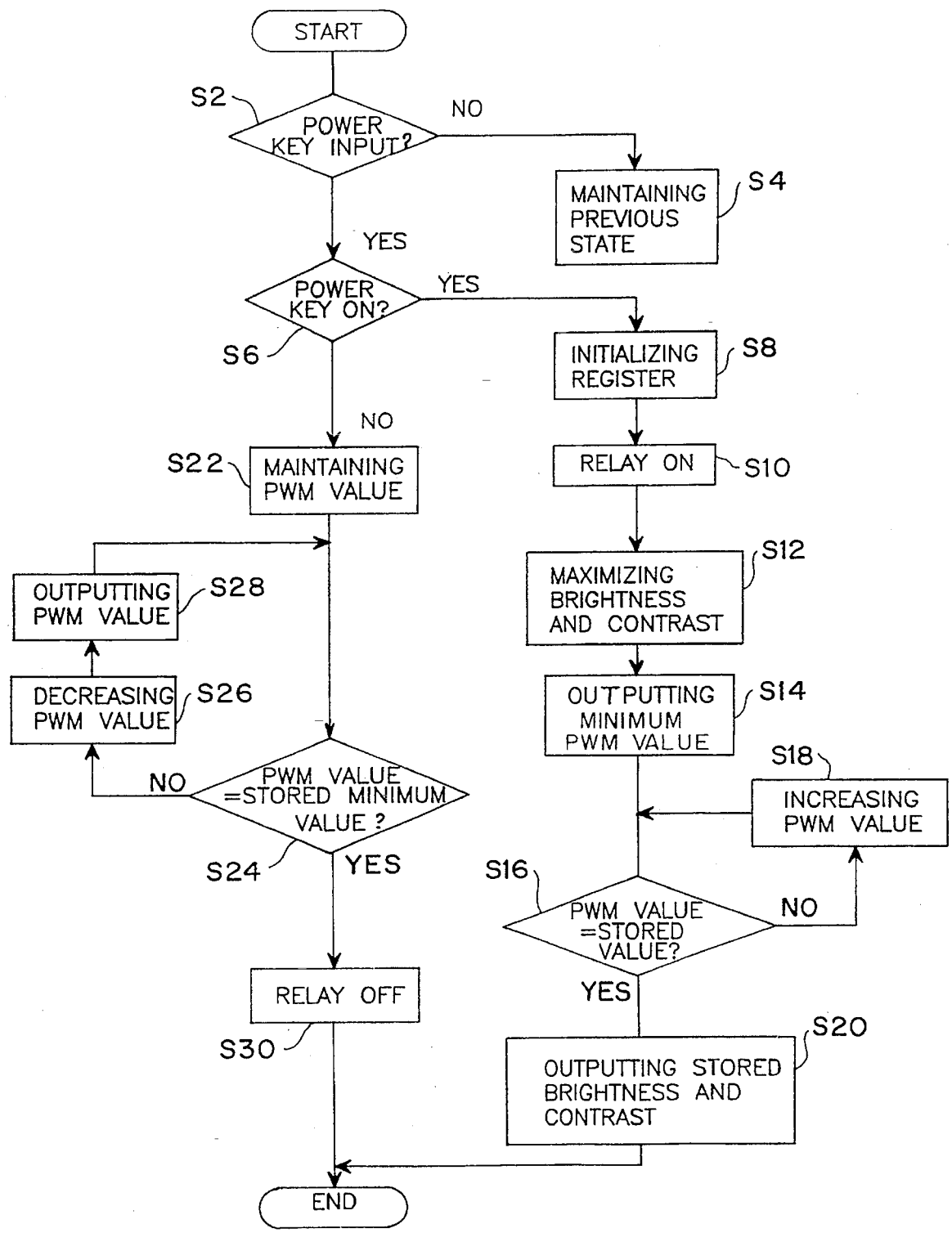
FIG. 3 is a flow chart explaining methods for controlling picture sizes in an LCD projector according to the present invention.

FIG. 3 is a flow chart illustrating methods for controlling picture sizes in an LCD projector. The flow chart of FIG. 3 will be described hereinunder with references of FIG. 1 and FIG. 2.

First, in step S2 the control logic section 121 of the microcomputer 12 detects whether a predetermined key, among keys on the key board 11 pressed by a user, is equal to the power key.

At this time, if the pressed key is not coincident with the power key, in step S4 the control logic section 121 maintains the state of the power key in the state it had been maintained before the key was pressed.

Meanwhile, (in step S6) if the pressed key is the power key, then (in step S8) the control logic section 121 initialize the register 123 and (in step S10) the relay 20 for the lamp and the relay 21 for the main electric power, respectively. In addition, the fan 23 operates when the relay 21 is turned on.

The control logic section 121 outputs the control signals to the display circuit section 24 that cause the display circuit section 24 (in step S12) to produce the maximum brightness and contrast of the picture. At the same time, the corresponding PWM value, i.e., minimum picture size, is temporarily stored by the control logic 121 into the register 123 and (in step S14) transmitted to the PWM generator 124. The PWM generator 24 outputs the PWM value to the integrator 13 and the integrated value thereof is output by the integrator 13 to the motor driving section 14. The motor driving section 14 converts the integrated value to a motor current which it supplies to the motor 15. The motor 15 responds by driving the gear 16, which causes the gear 17 integrated with the projection lens 18 to move forward the maximum amount thereby adjusting the picture size to a minimum.

After that, (in step S16) the control logic section 121 detects a coincidence between a temporarily stored value in the register 123 and a value of the storing section 122. At this time, the value stored in the storing section 122 is a value predetermined by the user.

At this time, if the control logic section 121 detects that the temporarily stored value is not coincident with the value stored in the storing section 122, (in step S18) the control logic section 121 increases the temporarily stored value up to a predetermined value, and the increased value is stored in the register 123 as a new value of the register 123. The new value of the register 123 is outputted from the PWM generator 124. The integrator 13, the motor driving section 14, and the motor 15 cooperate to transform the gradually increased PWM value into gradual backward motion of the projection lens 18, thereby gradually increasing the picture size.

With repeated steps as described above, if there is a coincidence in step S16 between the new value of the register 123 and the value of the storing section 122, the control logic section 121 terminates a step of comparing the value of the register 123 with the value stored in the storing section 122. Also, the control logic section 121 stores the value stored in the storing section 122 to the register 123 as the final value. The new value of the register is outputted from the PWM generator 124.

After repeating the steps as described above, the PWM generator 124 outputs the PWM signal, which corresponds to the value from the register 123, to the integrator 13. The final value of the register 123 is outputted from the PWM generator 124.

Accordingly, during the repeated steps, because the PWM generator 124 outputs the PWM signals, which corresponds to the value from the register 123, to the integrator 13, the picture size is increased from a minimum to a predetermined size during this warm-up period.

After the picture size is increased from a minimum size to the predetermined size, (in step S20) the control logic section 121 makes the value of the brightness and contrast of the display circuit section 24 be equal to the value stored in the storing section 122 by the user.

Meanwhile, if the pressing of the power key under conditions of the picture having attained predetermined brightness and contrast, causes a switch to the off-state, (in step S22) the control logic section 21 stores the output value of the PWM signals generator 124, which is driving data of the zoom motor, to the register 123 as the value of the register 123.

After that, in step S24, the control logic section 121 detects whether the value stored in the register 123 is coincident with the value stored in the storing section 122.

At this time, the value stored in the storing section 122 is not a value predetermined by the end-user, but a value predetermined by the manufacturer.

At this time, if the control logic section 122 detects that the value stored in the register 123 is not equal to the value stored in the storing section 122, then (in step S26) the control logic section 123 decreases the value stored in the register 123 to a predetermined value, and (in step S28) the decreased value is stored in the register 123 as a new value. The new value of the register 123 is transmitted to the PWM generator 124.

By repeating the steps, if a new value stored in the register 124 is equal to the value stored in the storing section 122, the control logic section 121 terminates comparison of the value of the register 124 and the control logic section 121, and the value stored in the storing section 122 is stored in the register 123 as the final value. The value of the register 123 is transmitted to the PWM generator 124.

Accordingly, during the repetition of the steps as described above, the PWM generator 124 outputs the PWM signals, which is correspond to the value from the register 123, to the integrator 13, so that the picture size on the screen is decreased to a predetermined picture size.

After the picture size is decreased to the predetermined picture size, the control logic section 121 switches the relay 21 off after the relay 20 is switched off.

Accordingly, (in step S30) the electric power is not supplied to the lamp 22 and the fan 23 by the switching off of the relay 20 and the relay 21, so that the lightning of the lamp 22 and the rotation of the fan are stopped.

As described so far, methods for controlling picture sizes in an LCD projector of the present invention have effects to decrease the picture size until the lamp, i.e., of lightning source, makes a normal lightning amount from the initial state of the power-on as well as to increase the brightness and contrast of the picture, so that the user can watch the massage of the screen as quickly as possible with the initially small lightning amount from the lamp.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method for automatically controlling picture size in an LCD projector during a warm-up period of a lighting source of the projector, comprising the steps of:

a) detecting whether power is turned ON or OFF;

b) initially projecting a minimum picture size, when the power is turned on; and c) gradually increasing, during a warm-up period, the picture size from the minimum picture size to a predetermined picture size.

2. The method of claim 1, further comprising:

d) gradually decreasing, when the power is turned off, the picture size from the predetermined picture size to the minimum picture size.

3. The method of claim 2, further comprising:

e) terminating, when the picture size reaches the minimum size, projection of the picture.

4. The method as in claim 1 further comprising:

d) initially setting, when power is turned off, a picture brightness level to a maximum level.

5. The method as in claim 4, further comprising:

e) changing the picture brightness from the maximum level to a predetermined level, the change being completed so as to be commensurate in time with the picture size being increased to the predetermined size.

6. The method as in claim 1 further comprising:

d) initially setting, when power is turned off, a picture contrast level to a maximum level.

7. The method as in claim 6, further comprising:

e) changing the picture contrast from the maximum level to a predetermined level, the change being completed so as to be commensurate in time with the picture size being increased to the predetermined size.

8. An apparatus for automatically controlling picture size in an LCD projector during a warm-up period of a lighting source of the projector, the apparatus comprising:

power detector means for detecting whether power to the projector has been turned on or off;

size initializing means, responsive to the power detector means detecting that power has been turned on, for initializing the picture size output by the projector to a minimum value;

growing means, responsive to the initializing means, for gradually increasing the picture size from the minimum size to a predetermined size, during a warm-up period.

9. An apparatus as in claim 8, further comprising:

brightness initializing means, responsive to the power detector means detecting that power has been turned on, for initially setting a picture brightness level to a maximum level.

10. An apparatus as in claim 9, further comprising:

dimming means, responsive to the growing means, for changing the picture brightness from the maximum level to a predetermined level, the change being completed so as to be commensurate in time with the picture size being increased to the predetermined size.

11. An apparatus as in claim 8, further comprising:

contrast initializing means, responsive to the power detector means detecting that power has been turned on, for initially setting a picture contrast level to a maximum level.

12. An apparatus as in claim 11, further comprising:

contrast reducing means, responsive to the growing means, for changing the picture contrast from the maximum level to a predetermined level, the change being completed so as to be commensurate in time with the picture size being increased to the predetermined size.

13. An apparatus as in claim 8, further comprising:

shrinking means, responsive to the power detector means detecting that power has been turned off, for gradually decreasing the picture size from the predetermined size to the minimum size.

14. An apparatus as in claim 13, further comprising:

termination means, responsive to the shrinking means, for terminating projection of the picture when the minimum picture size has been attained.

15. An article of manufacture comprising:

a computer usable medium including computer-readable program code means, embodied therein, for causing a computer to automatically control picture size in an LCD projector during a warm-up period of a lighting source of the projector, the computer-readable program code means in the article of manufacture comprising:

computer-readable program code power detector means for causing the computer to detect whether power to the projector has been turned on or off;

computer-readable program code size initializing means for causing the computer to initialize, when the power has been turned on, the picture size to a minimum value;

computer-readable program code growing means for causing the computer to gradually increase the picture size from the minimum size to a predetermined size, during a warm-up period.

16. The computer-readable program code means in the article of manufacture of claim 15, further comprising:

computer-readable program code brightness initializing means for causing the computer to initially set, when power is turned on, a picture brightness level to a maximum level.

17. The computer-readable program code means in the article of manufacture of claim 15, further comprising:

computer-readable program code dimming means for causing the computer to change the picture brightness from the maximum level to a predetermined level, the change being completed so as to be commensurate in time with the picture size being increase to the predetermined size.

18. The computer-readable program code means in the article of manufacture of claim 17, further comprising:

computer-readable program code contrast initializing means for causing the computer to initially set, when power is turned on, a picture contrast level to a maximum level.

19. The computer-readable program code means in the article of manufacture of claim 18, further comprising:

computer-readable program code contrast reducing means for causing the computer to change the picture contrast from the maximum level to a predetermined level, the change being completed so as to be commensurate in time with the picture size being increase to the predetermined size.

20. The computer-readable program code means in the article of manufacture of claim 15, further comprising:

computer-readable program code shrinking means for causing the computer to gradually decrease, when power is turned on, the picture size from the predetermined size to the minimum size.

21. The computer-readable program code means in the article of manufacture of claim 20, further comprising:

computer-readable program code termination means for causing the computer to terminate projection of the picture when the minimum picture size has been attained.

* * * * *